June 16, 1931.   R. P. JOHNSON   1,810,353
AUTOMATIC VALVE
Filed July 14, 1928
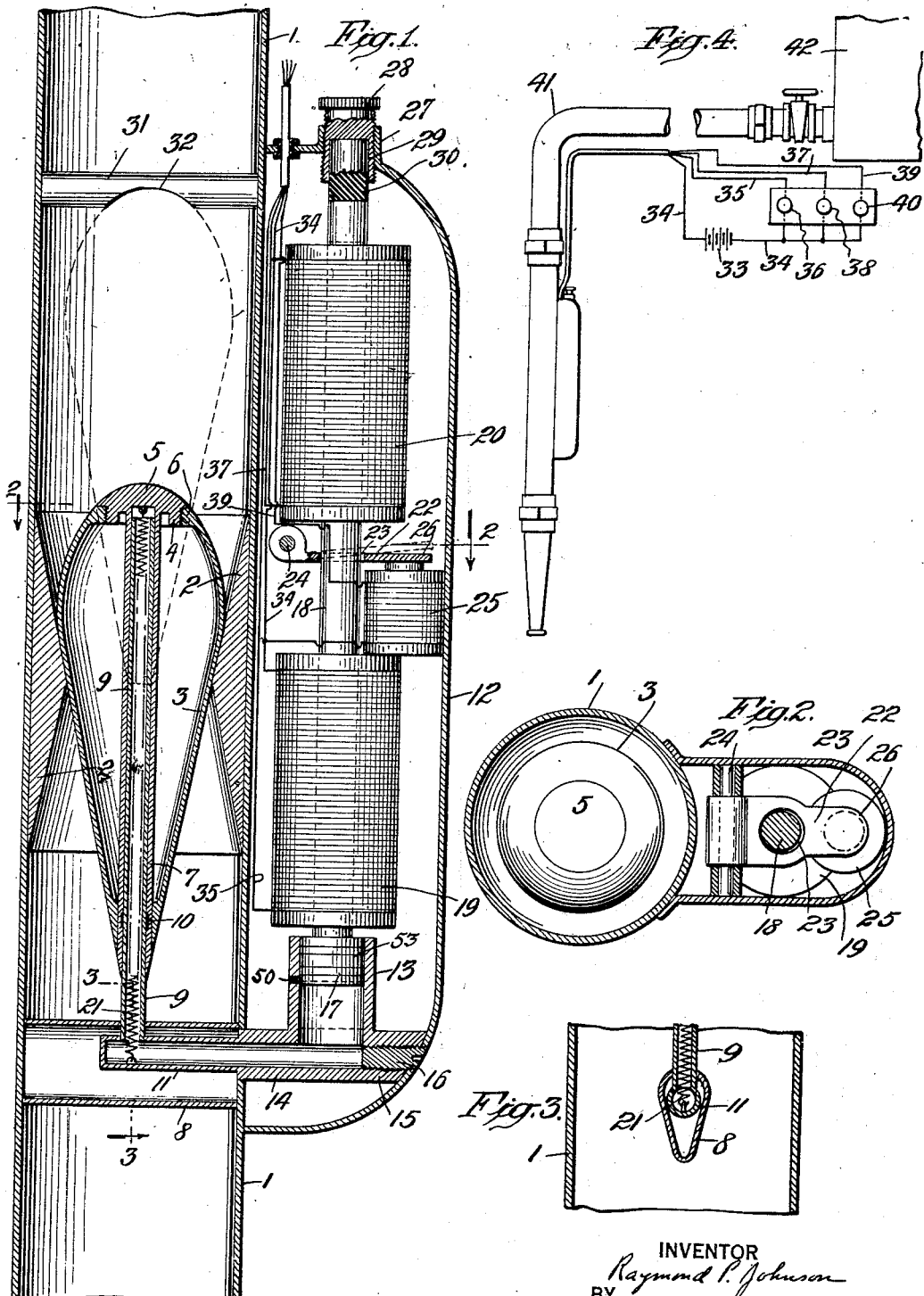
INVENTOR
Raymond P. Johnson
BY Henry Van Arsdale
his ATTORNEY Patented June 16, 1931

1,810,353

UNITED STATES PATENT OFFICE

RAYMOND P. JOHNSON, OF LYNBROOK, NEW YORK, ASSIGNOR TO STANDARD OIL COMPANY OF NEW YORK, OF NEW YORK, N. Y., A CORPORATION OF NEW YORK

AUTOMATIC VALVE

Application filed July 14, 1928. Serial No. 292,649.

This invention relates generally to valves, and more particularly relates to a valve for controlling and regulating the flow of fluid through a pipe or hose line, or the like, and to a method of and means for operating the valve.

The resistance to flow attributable to the presence of valves in a pipe line has always been recognized as an objectionable factor of considerable importance, since the flow pressure must be maintained sufficiently great to overcome this resistance in addition to gravity resistance and the resistance of the line itself, with enough excess pressure to spare to maintain the desired flow through the line.

Accordingly, a principal object of this invention is to provide a valve which offers the least possible objectionable resistance to fluid flow therethrough, and to provide a valve which does not leak when closed, and one which is simple and durable in construction, and may be operated readily and easily.

Another object of this invention is to provide a valve which eliminates any tendency of fluids to assume a whirling motion after leaving the valve, thus insuring a smooth and uniform discharge.

Another object of this invention is to provide a valve which is capable of being operated readily and easily from a proximate or remote point of control, or both, as desired.

Another object of my invention is to provide a valve which is of simple and durable construction, efficient and positive in operation, and alertly responsive to control.

A further object of this invention is to provide a method of and means for controlling the operation of the valve.

Other objects of this invention will be in part obvious and in part pointed out as the disclosure proceeds.

It is well known that the resistance of an object to the passing by of fluid is dependent to a great extent on the shape of the object and that the streamline shape offers the least resistance. It is also well known that an opening of Venturi shape offers less resistance to the flow of fluid therethrough than a restricted opening of any other shape. Accordingly, my invention contemplates the combination of a valve closure member of streamline shape in its longitudinal aspect and circular in its transverse aspect, coacting with a valve seat therefor of Venturi shape, to provide a valve which offers the least possible resistance to the flow of fluid therethrough. In addition, I provide hydraulic means for controlling the valve, and electrical means for actuating the hydraulic means.

In order that a clearer understanding of this invention may be had, attention is hereby directed to the accompanying drawings, forming a part of this application and illustrating one possible embodiment of my invention.

Referring to the drawings, Fig. 1 is a longitudinal cross-sectional view through my valve and valve casing, showing also the hydraulic and electrical means for operating the valve;

Fig. 2 is a horizontal cross-sectional view through the valve and valve operating mechanism, and is taken on line 2—2 of Fig. 1;

Fig. 3 is a fragmental longitudinal cross-sectional view of a portion of the structure, and is taken on line 3—3 of Fig. 1; and Fig. 4 is a diagrammatical view showing my valve and valve control mechanism applied to the discharge hose of an oil tank, as illustrative of one use to which my invention is particularly adapted, certain of the parts being shown broken away.

Similar reference characters refer to similar parts throughout the several views of the drawings.

Referring to the drawings, the valve structure in the main is housed and contained in a tubular casing 1. This casing may be circular or polygonal in cross-section and may be of the same cross-sectional diameter as the pipe or conduit to which it is joined. A member 2 having an opening of Venturi shape is circumferentially positioned within the casing and on one side of its apex affords a seat for the valve closure member, as shown. It is understood that the member 2 may be formed integral with the walls of the casing or may be formed as a separate member and secured to the interior thereof. A valve seat member of this form, having a Venturi opening, offers the least possible frictional resistance to the flow of fluids therethrough when the valve is open to any extent.

The valve plunger or closure member is preferably of streamline form and circular in cross-section, as shown. Its enlarged end is directed against the flow of fluid through the valve and is disposed in advance of the valve seat. Its tapered body extends through the valve opening and seats snugly and tightly against the tapered interior of the valve seat adjacent its mid section, the contacting surfaces of the valve seat and valve closure member being parallel, so that there is a wide area of contact between them. Means are provided for moving the valve closure member longitudinally of the casing and toward and from the valve seat to open and to close the valve. The amount to which the valve is opened corresponds with the distance the valve closure member is spaced from the valve seat. Any suitable means may be provided for adjusting the valve closure member with respect to the valve seat to operate the valve.

A valve of this type is exceptionally well adapted to be controlled by hydraulic means. To this end, the closure member may consist of an outer shell 3, which generally gives the member its streamline shape, provided on its larger end with a rounded cap 5 having a threaded flange 4 engaging a threaded collar portion 6 of the shell, and a tubular member 7 disposed longitudinally in the center of the shell and extending the full length thereof, the tube 7 being secured at one end to the cap 5 and at its other end to the small end of the shell 3 in a leak-proof manner, as by being soldered welded or screwed thereto. The cap 5 should be joined to the shell in a leak-proof manner.

Tube 7 is slidably and preferably almost completely telescoped on a stationary tube 9 which is secured to and supported on a cross member 8 which extends diametrically through the conduit and is secured at each end to the walls thereof. Cross member 8 is preferably hollow and of streamline shape transversely so as to offer the least possible resistance to the flow of fluid thereby. It is disposed beyond the valve seat member 2 through which the tube 9 extends. A cylinder 13 opens into a tubular portion 14, which is in open communication with the end of a pipe 11 disposed within the hollow cross member 8 and communicates with the open end of tube 9, which also enters cross member 8. The connections between tubes 14 and 11 and between tubes 11 and 9 should be leak-proof. Tube 14 may be extended in the opposite direction, as at 15, into alignment with a hole in the casing 12, and there closed by a clean-out plug 16 for the purpose of facilitating the cleaning out of the tubes 11 and 14 and the renewing of the hydraulic fluid. A piston head 17 fits snugly within the cylinder 13, and is adapted to be reciprocated therein to open and close the valve, in the manner now to be described. The piston head 17 is provided with a stem 18 for this purpose. The cylinder 13 and tubes 9, 11 and 14 are filled with the hydraulic fluid, which is preferably a smooth flowing oil, such, for instance, as a light lubricating oil.

Plug 16 is preferably of readily fusible material, such as Wood's metal, so that in a fire hazard this plug will melt out and the valve will close and stay closed irrespective of the position or movement of the plunger 18.

From the construction above described, it is apparent that, when the piston 17 is forced inwardly in the cylinder 13, the fluid will be forced through the tubes 14, 11 and 9 and out of the open extremity of the tube 9, pressing against the inside of the cap 5 of the valve closure member and forcing the closure member to slide outwardly on the tube 9, the oil being forced out of the tube 9, filling that portion of the tube 7 which is projected beyond the end of the tube 9. Thus, the further the piston 17 is moved inwardly of the cylinder 13, the further the closure member 3 and its tube 7 will be moved beyond the end of the pipe 9, and the greater will be the distance between the closure member and the valve seat, and consequently the greater will be the opening established through the valve The amount of this opening can be controlled and adjusted by predetermining the amount of movement of the piston 17 into the cylinder 13. This may be accomplished in any suitable manner, manually or otherwise, althought I prefer to control the movement of the piston 17 by electrical means. To close the valve, it is only necessary to return the piston 17 to its normal position in the cylinder 13. This will draw the fluid back into the cylinder 13 and draw the closure member inwardly on the tube 9, thus either closing the valve partially or completely, depending on whether the piston 17 has been fully or only partially retracted. It will be apparent that by providing a cylinder 13 which is diametrically larger than the diameter of the tube 7, the amount of movement of the closure member with respect to the tube 9 and to its valve seat will be greater than the distance through which the piston 17 is moved.

The electrical means for actuating the hydraulic means to control the valve will now be described. To this end, the stem 18 comprises suitable material, such as iron, serving as the armatures or cores of two electromagnets or solenoids 19 and 20, through which the stem 18 extends. Solenoid 19, when energized, attracts the core to force the piston head downwardly, forcing oil into the tubular guide member 9 and raising the closure member away from the valve seat. Solenoid 20, when energized, moves the core 18 to force the piston head upwardly, thus releasing the hydraulic pressure and causing the closure member to move toward its valve seat. A coil spring 21, one end of which is secured to cap member 5 and the other end to the interior of pipe 11, extends through the tubular guide member 9 and insures the alert return of the closure member to seating position. This movement is also aided by the pressure of fluid in the line, and by gravity when the valve is upright.

A catch device, which includes a plate member 22 having an aperture 23 therein through which core 18 extends, is hinged for swinging movement to pin 24 secured to the side walls of the housing 12. Hinged plate member 22 permits the core 18 to descend through its central aperture, but when the core attempts to rise or move in the other direction therethrough, plate member 22 exerts a binding, gripping action against the core, and prevents such upward movement. In consequence, the piston head is held immovable and the hydraulic displacement continues operative to hold the closure member in open position until the binding grip of the hinged plate member against the stem is released. I effect this release automatically by means of a small electromagnet 25 contained within the housing 12, the core of which, when magnetized, attracts a projecting portion 26 of the plate member 22 to pivot the plate member out of binding engagement with the core 18.

Housing 12 carries a threaded collar portion 27 at its top into which threaded screw cap member 28 is adapted to be screwed. The end of the screw cap member has a hollowed out portion 29 in which a resilient buffer 30 is secured and against which the end of core 18 is adapted to strike. By turning the screw cap 28 to the right or left, the maximum raised position of the stem core 18 and piston head 17 can be adjusted and fixed. Screw cap 28 would ordinarily be so adjusted as to permit the closure member to seat snugly upon its valve seat. A stop member 31, tubular and of streamline shape in cross-section, extends diametrically through tubular casing 1 and is secured to the side walls thereof. The underside of this stop member is rounded out, as at 32, to serve as an abutment for the rounded cap portion 5 of the closure member. The position of the stop member 31 determines the maximum opening movement of the valve closure member.

Preferably spring-pressed pins 50, having rounded heads, are mounted in the cylinder wall 13 and resiliently engage in a groove or recess in the piston 17 to hold the piston raised and to prevent displacement thereof by jars or by the weight of the rod 18. Slight downward movement of the piston might cause the valve to leak. Suitable packing 53 is also preferably provided.

A three-button switch arrangement is shown in Fig. 4 with a battery 33 connected in the circuit by means of which the operation of my valve may be effected. Lead wires 34 and 35 from button switch 36 are joined to the winding of solenoid 19. When the switch 36 is closed, current flows from the battery 33 through the solenoid 19, which then exerts a pull on core 18, which causes the piston head to move inwardly of cylinder 13, displacing fluid therefrom. The pressure exerted is sufficient to cause the closure member and its internal tube 7 to slide upwardly on guide member 9. When the cap portion strikes the stop member 31, the valve is open to the maximum extent. Since current flows into solenoid 19 only while the finger is retained on button switch 36, the extent to which the valve is opened is determined by the length of time this switch is kept closed. Thus the operator may control the amount the valve is opened. After this switch becomes open, the piston 13 cannot be raised, because the catch member 22 immediately grips core 18 with a binding action in case the core attempts to move upwardly. The valve is thus retained in open position to which it has been adjusted.

The release of stem 18 to permit closing of the valve is effected by electromagnet 25. Lead wires 34 and 39 from button switch 40 are joined to the winding of this electromagnet 25. When the switch is closed, the current flows from the battery 33 through the magnet 25, attracting the projecting metal portion 26 of the catch member. This force causes the catch member to pivot downwardly to release the binding grip between the core and the edges around the aperture 23. The stem 18 is now free to move upwardly.

The valve closing means includes lead wires 34 and 37 from push button 38 leading to the winding of solenoid 20. When switch 38 is closed, current flows from the battery 33 through the solenoid 20, exerting a lifting force on core 18, and, if magnet 25 is energized, causes the piston head to move upwardly. The oil then flows out of that part of tube 7 which has been projected beyond the tube 9 and returns to the cylinder 13. The closure member is simultaneously pulled against valve seat 2 by coil spring 21, with or without the help of gravity, and the aid of fluid pressure in the conduit, as the case may be.

I have found that by making stop member 31 and support member 8 of streamline shape in cross-section, and properly facing the flow, the resistance to flow is the least and there is practically no disturbance to the uniformity of the flow. The rounded end of my closure member of streamline shape is also positioned to face the flow. When the valve is in open position, as shown in dotted lines in Fig. 1, the fluids passing through the valve flow past the closure member with little frictional loss, in accordance with well-known principles, and the stream discharged from the valve is uniform and smooth.

My valve has proven to be very practical in use, for instance, when connected to the discharge hose 41 of an oil supply tank 42, as illustrated in Fig. 4. It is understood, however, that my valve is not limited to this use, but may be located to advantage in any fluid circuit where a uniform, smooth flow and little frictional loss is desirable, and the fluid is either a liquid or a gas.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. A valve of the character described, including a fluid conduit, a valve seat member of double cone-shaped formation having a Venturi opening disposed within said conduit, a guide rod, a pear-shaped closure member telescoping over said guide rod and movable longitudinally thereon to open and close the valve the larger end of the closure member being presented against the direction of intended fluid flow through the valve, and in advance of the most restricted part of the opening in said valve seat member, and means for controlling the movement of said closure member.

2. A valve of the character described, including in combination, a valve seat member, a pear-shaped closure member adapted to seat against said valve seat, a tubular guide member extending into said closure member, said closure member having a tubular portion slidably telescoping over said guide member, and means for forcing a fluid through said tubular guide member and into said tubular portion to move said closure member away from said valve seat to open the valve.

3. A valve of the character described, including in combination, a fluid conduit, a valve seat member in said conduit, a coacting pear-shaped closure member movable with respect to said valve seat, a stationary tube extending into said closure member, said closure member having a tube slidably telescoping over said stationary tube, and means for forcing a fluid from the stationary tube into the slidable tube to move said closure member away from the valve seat to open the valve.

4. An apparatus of the character described, including in combination, a valve casing, a valve seat member within said casing, a closure member adapted to seat against said valve seat, a tubular guide member, said closure member having a tubular portion slidably telescoping over said guide member, hydraulic means for moving said closure member with respect to the valve seat, said means including a cylinder, a piston and a conduit connecting said cylinder with one end of said tubular guide member, and resilient means disposed within said tubular guide member and connected to said closure member for normally retaining said closure member in valve seating position.

5. An apparatus of the character described, including in combination, a valve casing, a valve seat within said casing, a closure member adapted to seat against said valve seat, means operated by hydraulic pressure for moving said closure member away from the valve seat to open the valve, electrical means for actuating said hydraulic means, and resilient means positioned within and secured to said closure member for normally retaining said closure member in valve seating position.

6. An apparatus of the character described, including in combination, a valve casing, a valve seat within said casing, a closure member adapted to seat against said valve seat, means operated by hydraulic pressure for moving said closure member away from the valve seat to open the valve, electrically operated means for actuating said hydraulic means to build up and to release said pressure to cause the valve to open and to close, and an electrically controlled catch device coacting with said hydraulic and electrical means for causing the valve to be retained in open position.

7. An apparatus of the character described, including in combination, a valve casing, a valve seat member within said casing, a closure member adapted to seat against said valve seat, a tubular guide member, said closure member having a tubular portion slidably telescoping over said guide member, hydraulic means for moving said closure member with respect to the valve seat, said means including a cylinder, a piston and a conduit connecting said cylinder with one end of said tubular guide member, electrical means for moving said piston inwardly of the cylinder to open the valve, and resilient means disposed within said tubular guide member and connected to said closure member for normally retaining said closure member in valve seating position.

8. An apparatus of the character described, including in combination, a valve casing, a valve seat member within said casing, a closure member adapted to seat against said valve seat, a tubular guide member, said closure member having a tubular portion closed at one end and open at its other end slidably telescoping over said guide member, hydraulic means for moving said closure member with respect to the valve seat, said means including a cylinder, a piston and a conduit connecting said cylinder with one end of said tubular guide member, and means for moving said piston inwardly of the cylinder to open the valve, said means including a stem on the piston and comprising magnetic material and a solenoid encircling said stem, whereby the stem is moved magnetically when the solenoid is energized.

9. An apparatus of the character described, including in combination, a valve casing, a valve seat member within said casing, a closure member adapted to seat against said valve seat, a tubular guide member, said closure member having a tubular portion closed at one end and open at its other end slidably telescoping over said guide member, hydraulic means for moving said closure member with respect to the valve seat, said means including a cylinder, a piston and a conduit connecting said cylinder with one end of said tubular guide member, electrical means for moving said piston inwardly of the cylinder to open the valve, and means for locking said piston in inwardly projected position to hold the valve open.

10. An apparatus of the character described, including in combination, a valve casing, a valve seat member within said casing, a closure member adapted to seat against said valve seat, a tubular guide member, said closure member having a tubular portion slidably telescoping over said guide member, hydraulic means for moving said closure member with respect to the valve seat, said means including a cylinder, a piston and a conduit connecting said cylinder with one end of said tubular guide member, electrical means for moving said piston inwardly of the cylinder to open the valve, means for locking said piston in inwardly projected position to hold the valve open, and electrical means for releasing said locking means to permit the valve to close.

11. An apparatus of the character described, including in combination, a valve casing, a valve seat member within said casing, a closure member adapted to seat against said valve seat, a tubular guide member, said closure member having a tubular portion closed at one end and open at its other end slidably telescoping over said guide member, hydraulic means for moving said closure member with respect to the valve seat, said means including a cylinder, a piston and a conduit connecting said cylinder with one end of said tubular guide member, electrical means for reciprocating said piston in the cylinder to open and close the valve, and resilient means disposed within said tubular guide member and connected to said closure member for normally retaining said closure member in valve seating position.

12. An apparatus of the character described, including in combination, a valve casing, a valve seat member within said casing, a closure member adapted to seat against said valve seat, a tubular guide member, said closure member having a tubular portion slidably telescoping over said guide member, hydraulic means for moving said closure member with respect to the valve seat, said means including a cylinder, a piston and a conduit connecting said cylinder with one end of said tubular guide member, and means for reciprocating said piston in said cylinder to open and to close the valve, said means including a stem on the piston and comprising magnetic material and two solenoids encircling said stem, one solenoid when energized being adapted to magnetically move said stem and piston in one direction, and the other solenoid being adapted when energized to move said stem and piston magnetically in the opposite direction.

This specification signed this 9th day of July, 1928.

RAYMOND P. JOHNSON.